United States Patent [19]
Foster

[11] Patent Number: 5,948,081
[45] Date of Patent: Sep. 7, 1999

[54] SYSTEM FOR FLUSHING QUEUED MEMORY WRITE REQUEST CORRESPONDING TO A QUEUED READ REQUEST AND ALL PRIOR WRITE REQUESTS WITH COUNTER INDICATING REQUESTS TO BE FLUSHED

[75] Inventor: Joseph E. Foster, Spring, Tex.

[73] Assignee: Compaq Computer Corporation

[21] Appl. No.: 08/995,367

[22] Filed: Dec. 22, 1997

[51] Int. Cl.$^6$ ........................................................ G06F 7/00
[52] U.S. Cl. ................................. 710/40; 710/39; 710/35; 710/5; 710/6; 710/25; 710/26; 710/52; 710/58
[58] Field of Search ..................................... 345/501, 505; 395/182.11, 292, 859; 711/100, 151, 156; 710/5, 6, 25, 40, 26, 35, 39, 52, 58

[56] References Cited

U.S. PATENT DOCUMENTS

| | | | |
|---|---|---|---|
| 4,757,439 | 7/1988 | Stinson et al. | 711/156 |
| 5,590,304 | 12/1996 | Adkisson | 711/100 |
| 5,649,157 | 7/1997 | Williams | 711/151 |
| 5,659,687 | 8/1997 | Kim et al. | 395/292 |
| 5,787,243 | 7/1998 | Stiffler | 395/182.11 |
| 5,818,464 | 10/1998 | Wade | 345/501 |
| 5,821,949 | 10/1998 | Deering | 345/505 |

*Primary Examiner*—Thomas C. Lee
*Assistant Examiner*—Albert Wang
*Attorney, Agent, or Firm*—Kevin L. Daffer; Conley, Rose & Tanyon

[57] ABSTRACT

A computer is provided having a bus interface unit between a CPU bus and a memory bus. The bus interface unit includes a memory controller and a read/write queue manager. The memory controller dispatches, or removes read requests or write requests from respective read or write requests queues depending on various modes of operation. Typically, the read requests are dispatched or removed either singularly or as a programmed series of read requests prioritized over write requests unless the write request queue is almost full. If the write request queue is almost full, then write request are removed either singularly or in a series before servicing the read request queue. The number of read or write request being removed from their respective queues can be programmed within a configuration register operably coupled to a controller arranged between the read and write request queues. The memory controller determines how many requests will be serviced within possibly a lengthy series of requests. By dispatching like requests (a series of reads followed by a series of writes, etc.) memory bus efficiency and/or pipelining is greatly improved.

18 Claims, 4 Drawing Sheets

SYSTEM FOR FLUSHING QUEUED MEMORY WRITE REQUEST CORRESPONDING TO A QUEUED READ REQUEST AND ALL PRIOR WRITE REQUESTS WITH COUNTER INDICATING REQUESTS TO BE FLUSHED

BACKGROUND OF THE INVENTION

1. Field of the Invention

This invention relates to a computer system and, more particularly to memory request queue logic combined with a memory controller to present streams of memory read or memory write requests to system memory according to one of three programmable modes of operation.

2. Description of the Related Art

Modern personal computers are often called upon to perform at increasingly higher levels. For example, many desktop and portable personal computers may employ a high speed central processing unit ("CPU") and multiple busses between the CPU and numerous peripheral devices. Multiple busses may include a CPU local bus connected between the CPU, a peripheral bus connected to slower peripheral (or I/O) devices, and a mezzanine bus connected between the CPU local bus and the peripheral bus. The peripheral bus can be classified as, for example, an industry standard architecture ("ISA") bus, and enhanced ISA ("EISA") bus or a microchannel bus. The mezzanine bus can, alternatively, be considered a peripheral component interface ("PCI") bus to which higher speed input/output devices can be connected.

Coupled between the various busses are bus interface units. According to somewhat known terminology, the bus interface unit coupled between the CPU bus and the PCI bus is often termed the "north bridge". Similarly, the bus interface unit between the PCI bus and the peripheral bus is often termed the "south bridge".

When accommodating various busses, a modern north bridge allows accesses to and from a computer main memory (or system memory) connected to the north bridge. Thus, a north bridge may comprise a memory controller for controlling, e.g., a dynamic random access memory ("DRAM"). DRAM architecture is generally well known, and includes an array of storage cells. Access to the storage cells is accomplished by dividing an address signal into two parts and multiplexing them onto the row and column address pins of the memory array. When row address strobe ("RAS") is active, the row address latch in row decoder of the DRAM allows selection of one row within the array. When the column address strobe ("CAS") is asserted, the column address is decoded and latched to one of multiple sense amplifiers arranged across the column of the array. The state of write enable ("WE") signal determines whether data is read ("DOUT") or written ("DIN").

Most DRAMs support various access modes including, for example, page mode, static-column mode, as well as various high-speed refresh and pre-charge mechanisms. Page mode or static mode came about in an effort to enhance the speed of DRAMs relative to the CPU. Essentially, page mode and static-column mode help minimize wait states (i.e., times at which the CPU is suspended in order to allow the memory to catch up with the CPU).

Another technique for minimizing wait states is to separate the DRAM into two or more banks. Data held in alternate banks allows the CPU to access the alternate banks when it reads sequential bytes. When one bank is read, the other may be cycling so that the CPU does not have to wait.

The combination of page mode, static-column mode, and banked memory helps enhance the throughput or bandwidth of the memory bus coupled between the memory controller and the system memory. Another enhancement to bandwidth includes the recent advances into synchronous DRAM ("SDRAM"). Essentially, SDRAM synchronizes all address, data and control signals with a single system clock. The system lock is preferably the same clock which operates the CPU bus up to, for example 100 Hz. An SDRAM offers substantial advantages over asynchronous DRAMs. For example, asynchronous DRAMs do not allow access to a row within the array until a previous row access is completed. By contrast, an SDRAM includes separate commands for accessing and pre-charging multiple rows of storage cells in the array. Once row and column addresses are provided to an SDRAM having multiple bank arrays, a banked memory array which is accessed remains active. The selected row remains open until a pre-charge command precharges the selected row in the memory array.

Recent advances in high speed memory access allows "like" accesses to be performed more efficiently, essentially in a back-to-back manner. For example, if a sequence of read requests are presented to the memory, the read request can be more quickly serviced than if they are not interspersed with write request, regardless of whether the read requests are in the same bank or page. Thus, similar types of request (i.e., all reads versus all writes) can be more readily pipelined through the memory bus if, for example, a read request is not followed by a write and then by another read.

Breaking read requests (or write request) with write requests (or read request) reduces the pipeline efficiency of the memory bus due to SDRAM read/write or write/read idle time requirements. The idle time between reads and writes, or writes and reads, consumes bandwidth and temporarily breaks the pipeline. A mechanism which can more optimally arrange a stream of read request or write request would therefore improve the memory bus bandwidth. This improvement will be further enhanced if the memory controller is in page mode or if banked memory is implemented, for example. The desired technique of streaming like requests may, however, require queuing the request and cross snooping between read and write request to prevent corruption.

SUMMARY OF THE INVENTION

The problems outlined above are in large part solved by a device and method for improving memory bus efficiency. The device includes an interface unit coupled between a memory requester and the memory. The memory requester is deemed any device which can seek access (i.e., request) the memory, a suitable memory being asynchronous or synchronous DRAM. The interface unit is therefore a bus interface unit between the CPU bus and the memory bus, as well as possibly between other busses and the memory bus. For example, the interface unit provides coupling of a dedicated graphics bus or the PCI bus to the memory bus. Thus, the interface unit may be considered a north bridge, and the memory requestor comprises an input/output device, such as a disk drive, a display, a keyboard, or any device which can present parallel- or serial-fed addresses and data.

According to one embodiment, the interface unit includes a queue manager. The queue manager includes logic which performs cross-snooping between a first and second request queue. The first request queue can be considered a write request queue, whereas the second request queue can be considered a read request queue. Thus, the memory requester dispatches read and write memory requests to a memory controller via the queue manager.

According to another embodiment, queue snoop logic is coupled within the queue manager between the first and second request queues. The queue snoop logic helps determine a hit to a request queue, and the location of that hit within the requested queue. For example, if a read request encounters a hit within the write request queue, then write request within the write request queue (first request queue) must be flushed.

According to yet another embodiment, a controller is coupled to the queue manager. The memory controller includes logic to service read requests before write requests unless there is a flush requested, or if the write request queue is almost full.

Read requests are normally serviced before write requests. However, if the write request queue is substantially full, then write request must be serviced. A pre-defined number of read requests or write requests are serviced according to a "burst" selection mode. When the substantially full condition of the write request queue goes away, the memory controller returns to the mode of servicing reads before writes (unless a flush condition occurs). If there are no hits resulting from cross-snooping, read requests will always be serviced before writes (unless, again, a flush condition or the write request queue being almost full). Under instances when the write request queue is almost full, the memory controller can be programmed to pipeline "N" number of write requests onto the memory bus before incurring idle times associated with switching from, e.g., writes to reads Cross-snooping can be considered as a mechanism for keeping track of a hit to a previous memory request stored within one request queue and a current memory request dispatched to the other request queue. If the current and previous memory requests are at the same memory address location, then a hit occurs which is then presented to the memory controller. One or more cache lines can be dispatched from a respective request queue to the memory controller until the hit no longer exists. This allows a stream of like memory requests to be pipelined onto the memory bus before incurring idle times associated with switching from reads to writes.

Broadly speaking, the present invention contemplates a computer system. The computer system comprises a memory requester, such as a CPU, graphics accelerator, or peripheral device (i.e., a device peripheral to a motherboard on which the CPU resides). The computer system further includes a memory, such as DRAM or SDRAM. An interface unit is coupled between the memory requester and the memory, and includes a first request queue and a second request queue. A queue controller is coupled between the first and second requests queues to determine, during operation, when a current memory dispatched from the memory requester to the second request queue is at the same memory address as a previous memory request stored within the first request queue. A memory controller is coupled to the queue controller for performing memory request to the memory bus. Read requests are serviced first unless (i) the write request queue requires flushing due to an address hit, or (ii) the write request queue is almost full. In the first instance (even though the write request queue is nearly empty), if there is a write request pending to the same address (i.e., a write hit) which a read request is to be serviced, then the write request must be de-queued or flushed first. In the latter instance, the write request queue must be de-queued in order before servicing the read request. When the write request queue is almost full, n memory requests are serviced from one request queue before toggling to the other, and then bursting n memory request from the other request queue. This provides a ping-pong flush technique of like n number of requests from each request queue.

BRIEF DESCRIPTION OF THE DRAWINGS

Other objects and advantages of the invention will become apparent upon reading the following detailed description and upon reference to the accompanying drawings in which.

Figure 1:
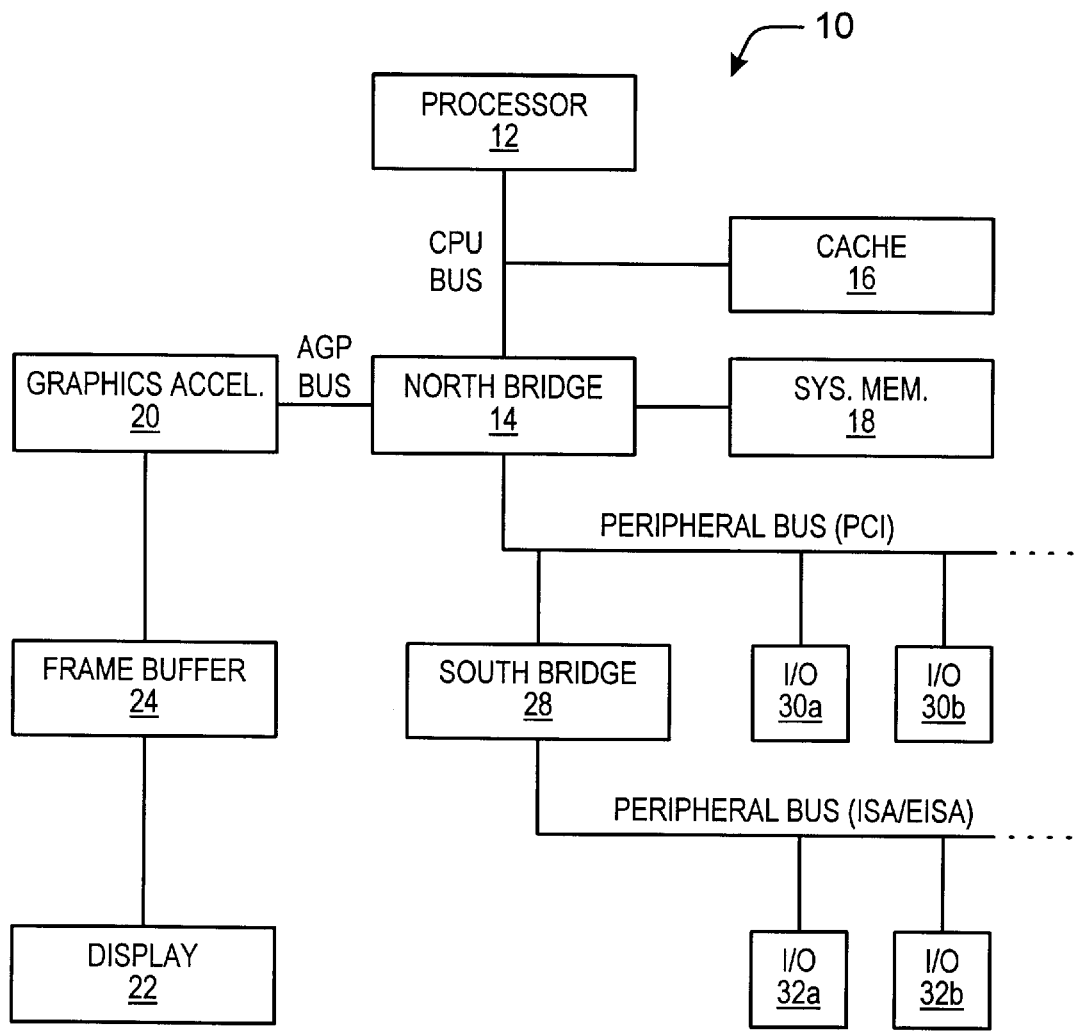
FIG. 1 is a block diagram of a computer system comprising north and south bus bridges.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning to the drawings, FIG. 1 illustrates a computer 10 having multiple buses, including a CPU bus, a mezzanine or PCI bus, and a peripheral bus or ISA/EISA bus. The CPU bus connects a CPU or processor 12 to a bus interface unit or north bridge 14. A cache memory 16 can be embodied within or external to CPU 12.

North bridge 14 provides an interface between components clocked at dissimilar rates. According to one embodiment, north bridge 14 interfaces a slower PCI bus and a faster CPU bus. North bridge 14 may also contain a memory controller which allows communication to and from system memory 18. A suitable system memory 18 comprises synchronous DRAM (or SDRAM). North bridge 14 may also include a graphics port to allow connection to a graphics accelerator 20. A graphics port, such as AGP, provides a high performance, component level interconnect targeted at three dimensional graphic display applications and is based on performance extensions or enhancements to PCI. AGP interfaces are generally standard in the industry, the common description of which is available from Intel Corporation.

Generally speaking, AGP is physically, logically, and electrically independent of the PCI bus and intended for the exclusive use of a display device 22 coupled to the graphics port (or AGP) by a graphics accelerator 20 and local memory or frame buffer 24. The form and function of a typical graphics accelerator is generally known in the art to render three dimensional data structures which can be effectively shifted into and from system memory 18 to alleviate increased costs of local graphics memory. Frame buffer 24 is generally understood as any buffer which can capture a frame of memory, defined as a still picture. Display 22 is any electronic display upon which an image or text can be presented. A suitable display 22 includes a cathode ray tube ("CRT"), a liquid crystal display ("LCD"), etc.

North bridge 14 is generally considered an application specific chip set, or application specific integrated circuit ("ASIC") that provides connectivity to various buses, and integrates other system functions such as memory interface and P1394. System memory 18 is considered the main memory and refers to a portion of addressable memory that the majority of memory access target. System memory 18 is accessed via north bridge 14, and is considered the largest continuous memory space of computer 10.

Unlike the CPU bus which runs at frequencies of, e.g., 66 MHz or 100 MHz, the PCI bus generally runs at approximately 33 MHz. A south bridge 28 is coupled between the PCI bus and the peripheral bus. Similar to north bridge 14, south bridge 28 is an ASIC or group of ASICs that provide connectivity between various buses, and may also include system functions. Attributable to the PCI bus are input/output ("I/O") devices 30 which require higher speed operation than I/O devices 32.

Figure 2:
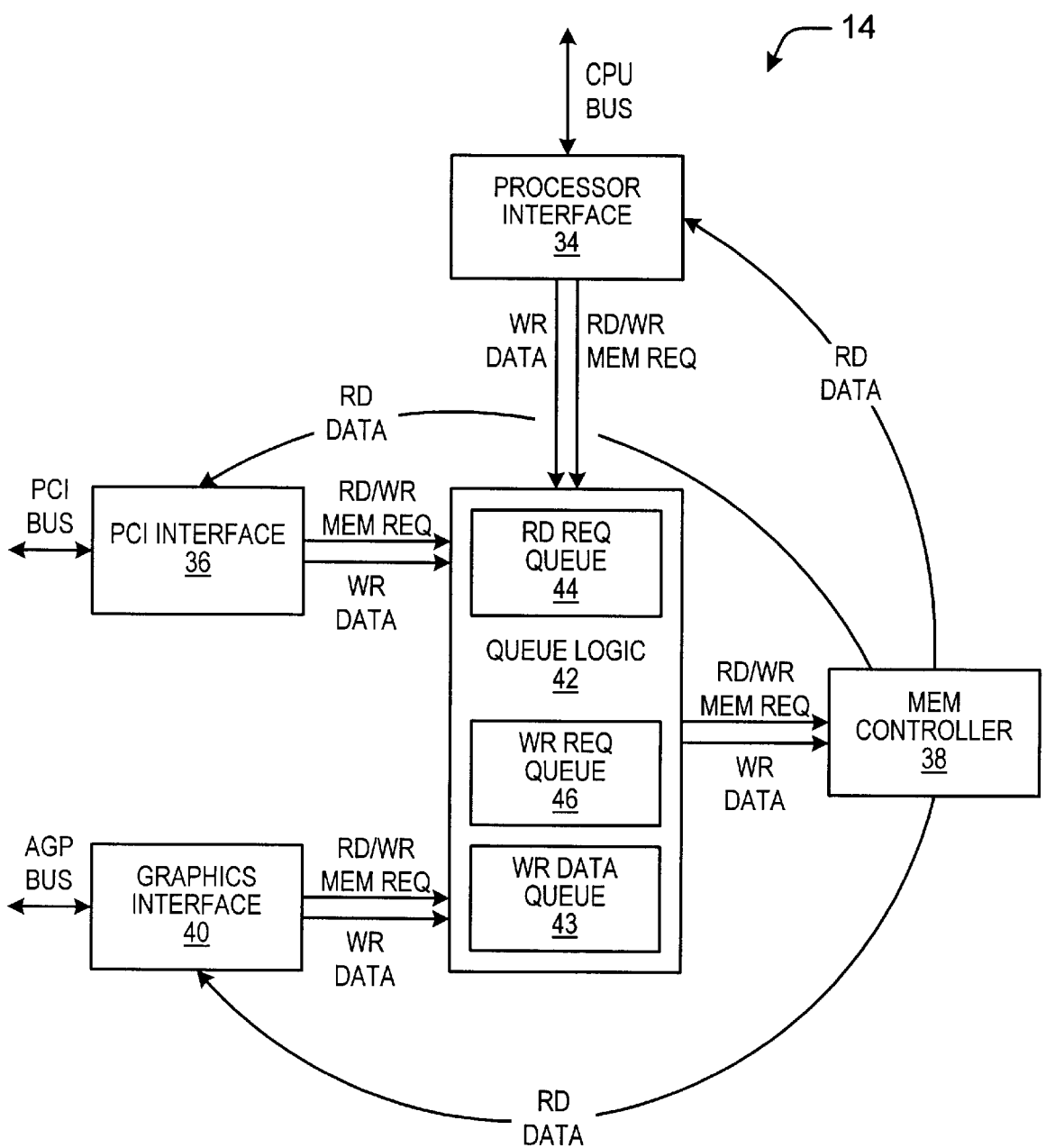
FIG. 2 is a block diagram of the north bridge comprising a memory queue manager and coupling thereto.

Turning to FIG. 2, details regarding north bridge 14 are shown. The various sub-components of north bridge 14 can be connected upon a monolithic substrate for high end portable computers. North bridge 14 operates in conjunction with a south bridge and includes at least four functional blocks: CPU interface 34, PCI interface 36, memory controller 38, and graphics (or AGP) interface 40. Interfaces 34, 36 and 40 each contain transient buffers where address and data information (write cycles only) for memory cycles are stored. These interfaces communicate with memory controller 38 via queue manager 42.

Queue manager 42 arbitrates from among various read and write memory request emanating from interfaces 34, 36 and 40. Queue manager 42 further includes a read request queue 44, a write request queue 46, and a write data queue 43. Queue manager 42 receives read/write requests from the various interfaces, arbitrates between them, and loads the requests in either the read request queue or the write request queue 44 and 46, respectively. Queue manager 42 also includes a write data queue 43 which receives write data destined for memory controller 38. Queue manager 42 does not necessarily give a higher priority to any one interface, allowing isochronous devices to be added without substantial changes to the overall design.

Figure 3:
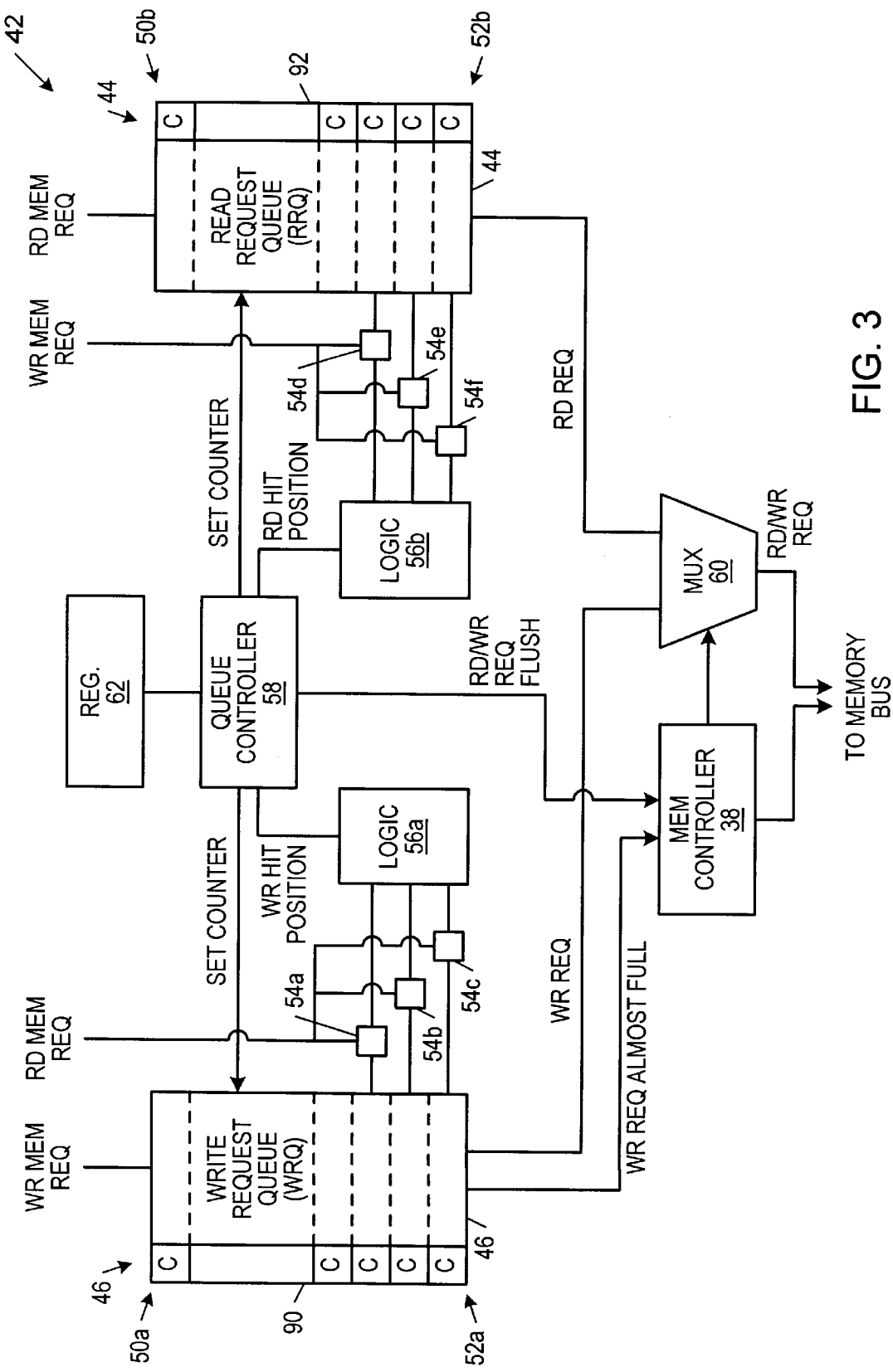
FIG. 3 is a block diagram of the memory queue manager embodiment comprising read and write requests queues, and a controller which flushes requests (read or write requests) to a memory controller by cross snooping and assigning a count number to cache lines entering the current request queue based on a hit position within the other request queue.

Turning to FIG. 3, further details regarding the cross-snooping feature in a technique by which read or write requests are flushed is provided according to one embodiment. Specifically, FIG. 3 indicates a structure which performs cross-snooping between write requests loaded into queue 46 (first request queue) and read request loaded into queue 44 (second request queue). Queues 46 and 44 each contain a plurality of storage locations which receive corresponding requests into the top 50 of each respective queue. The storage locations are, in effect, a series of registers which allow the requests to transfer from the bottom 50 to a top 52 of each queue.

Each write request preferably corresponds to four quad words (i.e., one cache line) of write data. According to one example, write request queue 46 is configured to store up to possibly eight write request. Separate portions of each of the eight storage locations of queue 46 may be provided to store chip selects, bank selects, row addresses and column addresses. By partitioning each request location in this manner, memory controller 38 (shown in FIG. 2) may advantageously de-queue portions as it requires them.

Read request queue 44 is similar in structure to write request queue 46, in that it may be implemented as a bank of registers, arranged from a top register (or storage location) to a bottom register (or storage location). Read request queue 44 may be configured, according to one example, to store up to four pending load requests from the various interfaces to north bridge 14. Similar to write request queue 46, read request queue 44 may, if desired, store an alternative number of pending request depending upon the number of overall interfaces serviced by memory queue manager 42, and upon performance requirements. A further similarity of queue 44 is that it may be split into several sections, one for chip selects, another for bank selects and row addresses, and the other for column address request sizes and read destinations to allow memory controller 38 (shown in FIG. 2) to selectively extract only a portion of a particular request as it needs the information. The destination information may be used by the memory controller to determine whether to send data back through queue manager 42, or to send read data directly to the requesting device.

It is additionally noted that one or more read holding buffers may be included within memory manager 42 to hold read data from memory destined to a snooping interface while a CPU snoop is effectuated. This allows a temporary location for read data from main memory to reside until it is determined whether a snoop write back occurs, in which case the write back data is sent to the requesting (e.g., CPU) interface.

FIG. 3 illustrates one exemplary implementation of snoop logic used to perform cross snooping between queues 44 and 46. As illustrated, a plurality of comparitors 54 are provided to compare the address of each valid request pending within registers of queues 44 and 46 with the address of a new ("current") request. The new request is initially issued from an interface, such as that shown in FIG. 2. If the addresses are the same, a hit is provided from logic units 56. It is recognized that the request queues, comparitors and logic units are symmetrical with respect to a pair of each of such devices, the operation of which is better illustrated with an example.

If a read request is dispatched from an appropriate interface to north bridge 14 (shown in FIG. 2), then the read request will be loaded into the appropriate request queue 44. The same applies to a write request held within the identified write request queue 46. Loading occurs into the bottom 50 of the pertinent request queue. For example, a write request queue 46 containing memory addresses of write requests can be compared (with a snooping operation) with read requests. If, for example, the third storage location from top 52a of queue 46 contains the same address as the current read request, then comparitor 54a will initiate a compare to logic 56a, thereafter issued as a write hit (WR HIT) from logic 56a. A write hit indicates a current read request address is the same address as a previously stored write request at, e.g., storage location three within queue 46. Queue controller 58 receives the write hit signal and dispatches a write request flush signal (WR REQ FLUSH) to memory controller 38. Logic within memory controller 38 discerns when to forward a select signal to multiplexer 60. The select signal selects flushing write requests (WR REQ), via multiplexor, from top 52a of queue 46. If either the write request flush or the write request almost full signal is active, then controller 38 will present a select signal upon multiplexer 60 that will ensure write requests are flushed before servicing reads. If a read hit occurs, queue controller 58 dispatches a read request flush signal to the memory controller, which then signals the multiplexer to flush read requests before servicing writes. The particular request being serviced, is forwarded onto the memory bus from multiplexer 60 along with other control signals forwarded from memory controller 38.

The previous write requests and the current read request example can be applied further. In fact, the current memory request can reside in either queue 46 or queue 44. The same applies to the current memory request. If, however, the previous memory request is at location three from top 52a of queue 46, then it is necessary that the first (top-most), second and third write request be removed via multiplexor 60 from queue 46 before removing the current read request loaded at the bottom-most location of queue 44. This implies removing the earlier-loaded write request (loaded prior to the previous memory request) along with the prior-loaded read request occurring prior to the current read request. This can be performed in a burst fashion according to one embodiment.

Normally, read request are de-queued or removed from queue 44 before write requests are removed from queue 46. Thus, it is said that read requests are given a higher priority by the memory controller than write requests as long as the number of pending write request in queue 46 is below a threshold number. However, when the number of write request reaches or surpasses that threshold number, the queue logic asserts an "almost-full" signal to indicate that the memory controller should start servicing write requests in lieu of read requests. The almost-full signal is shown in FIG. 3 as WR REQ ALMOST FULL. From that moment on, requests may be serviced from queue 46 and queue 44 in a ping-pong fashion until the almost full signal is deasserted. Removing the request when the almost full signal is asserted can occur in bursts, whereby at least two write requests are de-queued before transferring to the read request queue 44 and de-queuing read requests.

A configuration register 62 includes a series of bits which can be set during boot up or reset of the computer. Register 62 may, according to one exemplary embodiment, contain two bits which can set the burst length at which requests are de-queued to be one, two or three. If desired, the number of bits can extend beyond two to accommodate a burst length exceeding three. If, for example, the burst length n=3, then if the almost full signal is asserted, three write requests may be removed prior to toggling back to the read request queue and removing three read requests. Depending on how register 62 is coupled to controller 58, n=3 burst option may also be applicable to any instance in which requests are removed from a queue whenever the almost full signal is not asserted and regardless of whether read requests de-queuing takes priority over write request de-queuing.

As mentioned above, the n burst mode applies to times in which the almost full signal is asserted to allow write request de-queuing in a burst rather than one at a time. This equally applies to instances in which the read request is de-queued in favor of the write requests. Thus, in all instances it may be desirable to service a stream of like read request (or like write request) by the memory controller, and to allow toggling back an forth amongst the read/write requests queues, if desired.

FIG. 3 illustrates counters associated with each read or write requests within queues 44 and 46. The counters within write request 46 are denoted as reference numeral 90, and the counters associated with read request 44 are noted with reference numeral 92. Setting a count value and the mechanism for doing such, is described. For example, snooping requests within write request queue 46 when a new (current) read request is provided to the bottom of request queue 44 is discussed. The address of the current read request is compared to the addresses of each valid write request pending within write request 46 using queue snooping logic comprising comparators 54 and logic unit 56. If a hit to any location occurs, a signal is provided indicating the position of the hit within write request queue 46. This positional value is then stored in a counter associated with the current read request forwarded into the bottom 50b of queue 44. Thus, the current read request has associated with it a count value, and all subsequent read requests have a count value if a hit to the write request queue 46 occurs. As read request are removed from queue 44, the value within its counter is transferred, unchanged, to the associated counter of the next inline location into which the read request is shifted. Eventually, the read request will be at the top 52b of queue 44 as reads are de-queued from queue 44. Each time a write request is removed from queue 46, the non-zero values associated with each read request count within queue 44 are decremented. When the read request reaches the top 52b of queue 44, and is ready to be serviced by the memory controller, the value stored in the associated counter must be zero before it can be serviced. If the value is not zero, a write request flush signal must be asserted to cause further de-queuing of write request from queue 46 until the value within the read request counter at the top 52b of queue 44 reaches zero. This condition indicates that the write request which caused the snoop hit when the associated read request was loaded into queue 44 has been de-queued from queue 46 and serviced by the memory controller before the associated read request is de-queued.

It is noted that snooping read request queue 44 by a current write request is similar in operation. That is, a current write request address can be compared to previously scored read request within queue 44, and a count value established within counter 90 of each loaded write request. Thus, counters 90 and 92 are present for each queue 46 and 44, respectively.

The benefit in knowing a count value, and attributing that count value based on a hit position in the opposing request queue allows knowledge to be gained as to how many requests must be removed in the opposing request queue before the current (or targeted) request signal can be removed. Controller 58 sets the counter based on the write hit position (for example) if comparator 54a indicates a write hit, then logic 56a will decode the hit position to queue controller 58, which then forwards a count value to the current read request signal loaded into the bottom 50b of queue 44. The opposite applies to setting a count position within a current write request loaded into the bottom 50a of queue 46. In either case, the count value indicates the number of memory request that must de-queued in the opposing queue before the memory controller can service the current (queue-loaded) requests. A programmable flush routine must therefore take into account the count value when performing its burst mode of operation, its read priority mode of operation, or whenever the write request queue must be flushed in response to an almost full signal.

Figure 4:
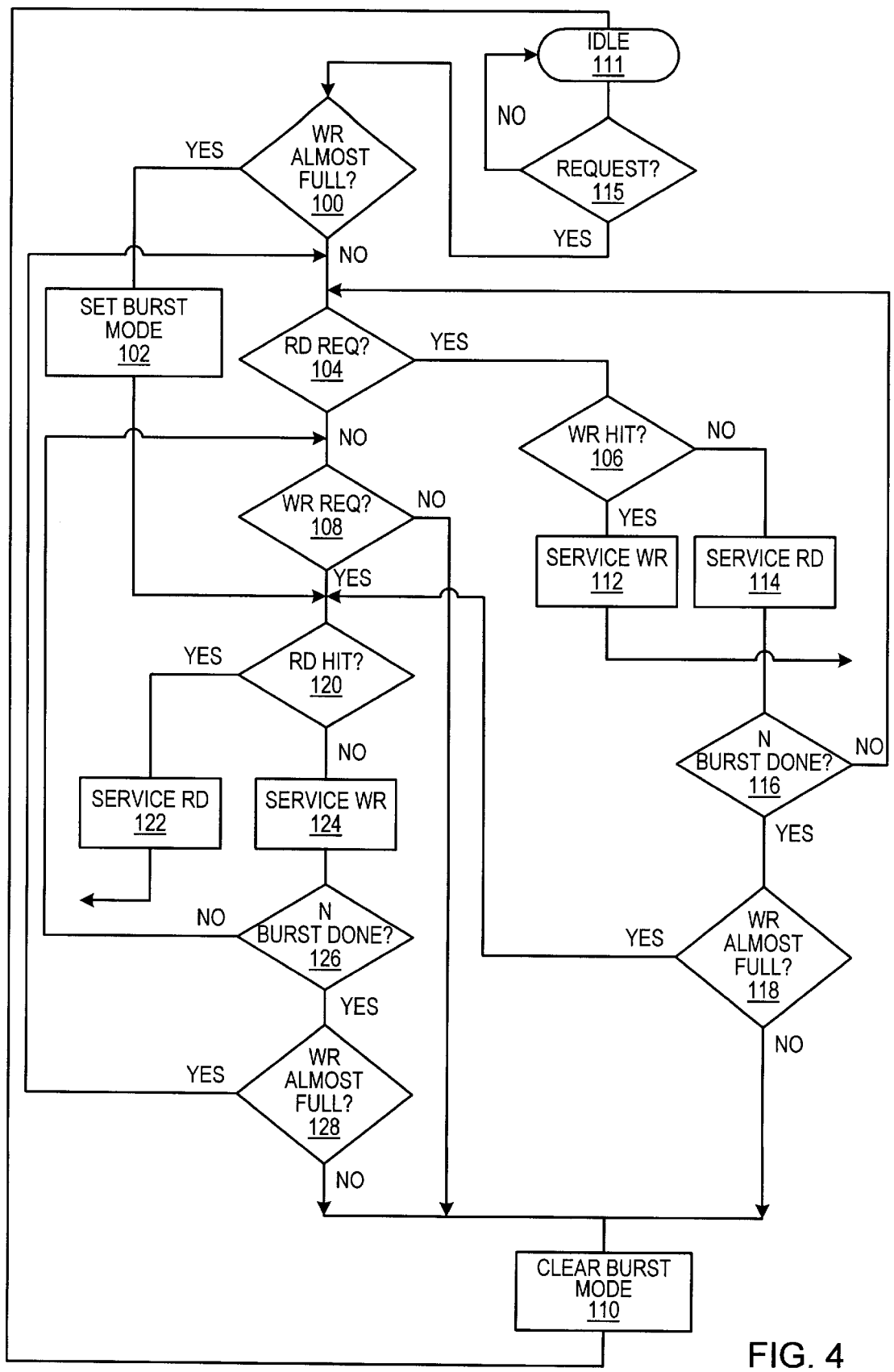
FIG. 4 is a flow diagram of read and/or write requests serviced by the memory controller, wherein reads are serviced first unless a write-almost-full condition occurs, at which time the memory controller would burst like request for up to a programmable value n.

FIG. 4 illustrates one example of the programmable modes of operation which can be established within the configuration register 62 of FIG. 3, and carried out by the memory controller 38 of FIGS. 2 and 3. Normally the memory controller is idle. When a memory access request is received, the write request status is checked. If the write request queue is almost full 100 then write requests can be serviced in a burst fashion by setting the burst mode 102. If the write request queue is not almost full, then the memory controller is capable of servicing a read request 104. The loaded read request address is compared to pending write requests in the write request queue to determine if a write hit 106 is present. If a read request is not serviced, then an opportunity exists for servicing a write request 108. If neither the read or write requests are loaded, then burst mode can be cleared 110 and the flow returns to idle 111 to wait for another request 115.

If a read request is loaded, and a write hit occurs, then the write request comparable in address to the read request is serviced 112 from the write request queue. However, if write hit does not occur, then the read request is serviced 114. After servicing the write request 112, flow returns to determining if a read or write request should be serviced. Multiple read requests can be serviced in bursts until N number of bursts are completed 116. Once N bursts are done, the write request queue is again monitored to determine if the write request queue is almost full. If not, then the burst mode can be cleared 110.

If a write request is loaded, the write request is compared against addresses within the read request queue to determine if a read hit 120 is present. If a read hit occurs, then the read request having similar address to the current write request must be serviced 122. However, if a read hit does not occur, then the write request can be serviced 124. Write request can be serviced in bursts. After N number of bursts occur 126, then the write request queue is again monitored to see if it is almost full 128. If N number of burst has not been reached, then bursts can continue for subsequent servicing of write (or read) request.

As shown, if the write request queue is not almost full, and servicing of reads is not given priority, then a burst selection can be established whereby a set number N of read requests, followed by write (or vice versa) can be serviced.

Servicing read requests in favor of write requests proceeds by removing read requests if the read count value is equal to zero. If the count value is zero, then read flush occurs. However, if the count value is not zero, then read request cannot be flushed, and control is toggled back to determine if a write count value of write request equals zero. If the write request count is zero at the top storage location (s), then write requests are flushed or serviced. However, if the write count does not equal zero, and as previously described, the read count does not equal zero, then neither the read nor write request queues contain memory requests, and the memory bus goes idle. The entire sequence of detecting the read and write counts, and appropriately flushing the request queues is repeated as indicated.

If a programmable burst mode is selected, then a routine is begun whereby a number of memory requests removed from a particular requests queue is compared with the programmed number which are to be removed. The memory controller will attempt to service the "N" number of like requests as a burst. However, this is not always possible due to a flush condition. For example, if the number N to be removed equals three, as programmed into register 62 of FIG. 3, possibly not all of the three requests can be removed if some of the requests do not have a zero count (i.e., requires a flush of the other queue). This might be the case if the earlier two of three n requests have a zero count, but the last request is not zero. Thus, only the first two request can be removed or, as indicated below, possibly only the first request of the three requests. If, however, all three requests have a zero count, then all three requests can be removed. If the count of the current requests (i.e., the request at the top of the respective queue) is equal to zero, then that request is serviced from its respective queue. If the count value (flush indicator) at the top-most storage locations 52 of the current request queue (request queue 44 or 46) is not equal to zero (i.e., flush of opposite queue required), then request servicing is temporarily switched to the other request queue. Thus, if the current request queue is the read request queue, yet the top-most count value is not equal to zero, then the requests in the write request queue must be serviced first (flushed). On completion of the flush, servicing of the original queue continues.

The intent behind snooping the read and write request queues is to ensure data coherency. Read request from each and every memory requester interface must snoop pending write addresses in write request queue 46. The converse is also true. Request queue snooping preserves ordering from each interface. If a device writes and then reads the same address, it needs to receive that just-written data. If the write request in the write request queue is ignored, the read may receive obsolete data from the main memory. Accordingly, write request queue snooping is performed before a read request is queued into the read request queue. To complete the write request queue snoop quickly, (e.g., in less than one clocking), write request queue logic may be configured to compare only a subset of the addresses associated with the request. In one implementation, the snooping logic compares 14-bits of the addresses (e.g., bits 25:11 of the system address). It is understood that the selection of the number of bits for address comparison during the snooping operation is dependent upon the speed at which the comparison operation must be performed and depending upon performance degradation due to the increased possibility of false hits.

If a write request queue hit occurs relating to a new (current) read request, the read request is not serviced until a write request queue flush operation has fully occurred— especially as it relates to the identified (stored) write requests. In this manner, the previous write operation to the same address is completed prior to the read operation, thus ensuring coherency. Of course, read requests queue snooping is performed similar to write request queue snooping to avoid a write ahead of a read transaction to the same address.

The memory queue manager 42 may further send a snoop request to the CPU interface. A memory queue arbiter temporarily departs from its normal priority scheme (i.e., round-robin priority) and starts servicing the CPU interface until the snoop results are available. If a cache hit occurs, the memory queue arbiter remains at the CPU interface until write back data is sent from cache memory to the main memory. After the write back requests completes, the memory queue arbiter returns to the requesting interface. Once the snoop is finished, and the memory queue arbiter is return to the requesting device interface (i.e., memory requesting device) it loads the memory request into the appropriate request queue and proceeds to handle other requests as needed.

It is noted that a variety of specific mechanisms and methods may be employed to implement the snooping technique described above. It is further noted that write back data could be merged with data associated with an incoming write request using the byte enables of the write request as a mask.

It will be appreciated to those skilled in the art having the benefit of this disclosure that this invention is believed to be capable of performing a series of back-to-back read requests to a memory controller and ultimately upon a memory bus without intervening write requests. The opposite is true for a series of write request without intervening read request. By implementing a series of unbroken read or write requests, memory bus bandwidth is improved. Various modifications and changes may be made as would be obvious to a person skilled in the art having the benefit of this disclosure. It is intended that the following claims be interpreted to embrace all such modifications and changes, and, accordingly, the specification and drawings are to be regarded in an illustrative rather than a restrictive sense.

What is claimed is:

1. A computer system, comprising:

a memory requestor;

a memory;

an interface unit coupled between said memory requestor and said memory, wherein said interface unit comprises:

a first request queue having a first plurality of storage locations;

a second request queue having a second plurality of storage locations;

a queue controller coupled between the first and second request queues to determine, during operation, when a current memory request dispatched from the memory requestor to the second plurality of storage locations is at the same memory address as a previous memory request stored within the first plurality of storage locations;

a memory controller coupled to the queue controller for flushing to the memory the previous memory request and any memory requests loaded prior in time before servicing the current memory request; and wherein said first plurality of storage locations are ordered from a top of the first request queue to a bottom of the first request queue, and wherein the second request queue includes a counter associated with said current request queue containing a value dependent upon a location at which said previous memory request is relative to the top of the first request queue.

2. The computer system as recited in claim 1, further comprising a memory bus operably coupled between said interface unit and said memory.

3. The computer system as recited in claim 2, wherein said memory requestor comprises a device adapted to periodically obtain mastership of said memory bus.

4. The computer system as recited in claim 1, wherein said memory requester comprises a microprocessor.

5. The computer system as recited in claim 1, wherein said memory requestor comprises a peripheral device coupled to a peripheral component interface (PCI) bus operably linked to said interface unit.

6. The computer system as recited in claim 1, wherein said memory requester comprises a graphics accelerator device coupled to an advanced graphics port (AGP) bus operably linked to said interface unit.

7. The computer system as recited in claim 1, wherein said memory controller is adapted to receive a control signal forwarded from the queue controller for flushing a sequence of n memory requests stored within the first plurality of storage locations before servicing a single memory request stored within the second plurality of storage locations.

8. The computer system as recited in claim 1, wherein said memory controller is adapted to receive a control signal from the queue controller for flushing a sequence of memory requests stored within the second plurality of storage locations before servicing a single memory request stored within the first plurality of storage locations.

9. The computer system as recited in claim 1, wherein the value is decremented each time a memory request is removed from the first queue.

10. The computer system as recited in claim 9, wherein a series of memory requests are flushed from the first plurality of storage locations prior to servicing the current memory request if the decremented value of each of the series of memory requests is equal to zero.

11. The computer system as recited in claim 10, wherein the series of memory requests consists of n.

12. The computer system as recited in claim 11, wherein the n series of memory requests are flushed from the first plurality of storage locations containing a decremented value equal to zero immediately prior to servicing another n series of memory request from the second plurality of storage locations containing a decremented value equal to zero.

13. The computer system as recited in claim 11, wherein n programmably varies between one and three.

14. The computer system as recited in claim 13, further comprising a configuration register operably coupled to the memory controller for receiving a programmable bit indicative of the value of n.

15. A method for programmably bursting a series of memory requests from a memory queue manager to a memory, comprising:

providing a first request queue and a second request queue within the memory queue manager, each of which contain a plurality of memory requests;

setting a burst mode within a configuration register operably coupled to a memory controller;

snooping for a hit of a current memory request dispatched to the second request queue of a similar addressed previous memory request stored within the first request queue;

servicing a programmed n number of memory requests from the first request queue preceeding the previous memory request prior to servicing the previous memory request and the current memory request; and assigning a count value to the current memory request dependent upon the location of the previous memory request within the first request queue.

16. The method as recited in claim 15, wherein said servicing comprises priority removing n number of memory request from said first request queue if the first request queue is substantially full before removing n number of memory request from the second request queue.

17. The method as recited in claim 16, further comprising:

assigning a count value to the current memory request dependent upon the location of the previous memory request within the first request queue; and decrementing the count value each time a memory request is serviced from the first request queue.

18. The method as recited in claim 15, further comprising:

decrementing the count value each time a memory request is serviced from the first request queue.

* * * * *